United States Patent
Tsuchimoto et al.

(10) Patent No.: US 12,304,576 B2
(45) Date of Patent: May 20, 2025

(54) ANGLE DETECTOR, AC-ROTATING-MACHINE CONTROLLER, AND ELECTRIC POWER STEERING APPARATUS

(71) Applicant: Mitsubishi Electric Corporation, Tokyo (JP)

(72) Inventors: Yuya Tsuchimoto, Tokyo (JP); Tatsuya Mori, Tokyo (JP); Isao Kezobo, Tokyo (JP); Satoru Akutsu, Tokyo (JP); Isao Sonoda, Tokyo (JP); Genki Fujii, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 970 days.

(21) Appl. No.: 17/417,313

(22) PCT Filed: Jul. 9, 2019

(86) PCT No.: PCT/JP2019/027087
§ 371 (c)(1),
(2) Date: Jun. 22, 2021

(87) PCT Pub. No.: WO2020/240877
PCT Pub. Date: Dec. 3, 2020

(65) Prior Publication Data
US 2022/0073129 A1  Mar. 10, 2022

(30) Foreign Application Priority Data
May 27, 2019  (JP) .............................. 2019-0982214

(51) Int. Cl.
*G01B 7/30* (2006.01)
*B62D 5/04* (2006.01)
(Continued)

(52) U.S. Cl.
CPC .............. *B62D 5/0463* (2013.01); *B62D 6/10* (2013.01); *G01B 7/30* (2013.01); *G01D 5/244* (2013.01)

(58) Field of Classification Search
CPC .......... B62D 5/0463; B62D 6/10; G01B 7/30; G01D 5/244
See application file for complete search history.

(56) References Cited

U.S. PATENT DOCUMENTS 9,481,394 B2 * 11/2016 Kondo ...................... G01D 5/20
10,598,517 B2 * 3/2020 Okumura ............. G01D 5/2451
(Continued)

FOREIGN PATENT DOCUMENTS

| CN | 108885125 A | 11/2018 |
|---|---|---|
| JP | 2018-105757 A | 7/2018 |
| WO | 2008/020231 A2 | 2/2008 |

OTHER PUBLICATIONS

International Search Report for PCT/JP2019/027087 dated Sep. 10, 2019 [PCT/ISA/210].
(Continued)

*Primary Examiner* — Reena Aurora
(74) *Attorney, Agent, or Firm* — Sughrue Mion, PLLC

(57) ABSTRACT

An angle detector including; a magnet being mounted on a rotation axle and that has a first track magnetized in P pole-pairs and second track magnetized in Q pole-pairs, a first hole device group that senses magnetic flux from the first track, a second hole device group that senses magnetic flux from the second track, a first detection unit that outputs an M-step absolute angular signal through division of one electric-angle rotation into M sections, a second detection unit that outputs an N-step relative angular signal through division of each of the M divided sections into N sections, an angle calculation unit that divides the one electric-angle rotation into [M×N] sections and calculates an [M×N]-step
(Continued)

electric angular signal, based on the absolute angular signal and the relative angular signal, and an angle correction unit that outputs a correction angle supplemented so as to smooth the electric angular signal.

15 Claims, 16 Drawing Sheets

(51) Int. Cl.
    *B62D 6/10*       (2006.01)
    *G01D 5/244*      (2006.01)

(56) References Cited

U.S. PATENT DOCUMENTS

| | | |
|---|---|---|
| 2010/0030428 A1 | 2/2010 | Gärtner |
| 2011/0187355 A1 | 8/2011 | Dixon et al. |
| 2019/0109549 A1 | 4/2019 | Odagiri et al. |
| 2022/0349696 A1* | 11/2022 | Launay .................. G01D 5/16 |

OTHER PUBLICATIONS

Written Opinion for PCT/JP2019/027087 dated Sep. 10, 2019 [PCT/ISA/237].
Extended European Search Report issued Jun. 27, 2022 in European Application No. 19930609.3.
Reason for Refusal dated Jun. 29, 2023 in Chinese Application No. 201980096563.6.

* cited by examiner

FIG. 8A

IN THE CASE WHERE NO MANUFACTURING ERROR EXISTS

| ABSOLUTE ANGULAR SIGNAL | h0 | | | | h1 | | | | ... |
|---|---|---|---|---|---|---|---|---|---|
| RELATIVE ANGULAR SIGNAL | a0 | a1 | a2 | a3 | a0 | a1 | a2 | a3 | ... |
| ELECTRIC-ANGLE PATTERN | 1 | 2 | 3 | 4 | 5 | 6 | 7 | 8 | ... |

FIG. 8B

IN THE CASE WHERE A MANUFACTURING ERROR EXISTS

| ABSOLUTE ANGULAR SIGNAL | h0 | | | | h1 | | | | ... |
|---|---|---|---|---|---|---|---|---|---|
| RELATIVE ANGULAR SIGNAL | a0 | a1 | a2 | a3 | a0 | a1 | a2 | a3 | ... |
| ELECTRIC-ANGLE PATTERN | 1 | 2 | 3 | 4\|8 | 5 | 6 | 7 | 8 | ... |

ANGLE DETECTOR, AC-ROTATING-MACHINE CONTROLLER, AND ELECTRIC POWER STEERING APPARATUS

CROSS REFERENCE TO RELATED APPLICATIONS

This application is a National Stage of International Application No. PCT/JP2019/027087 filed Jul. 9, 2019, claiming priority based on Japanese Patent Application No. 2019-098214 filed May 27, 2019.

TECHNICAL FIELD

The present disclosure relates to an angle detector, an AC-rotating-machine controller, and an electric power steering apparatus.

BACKGROUND ART

An AC rotating machine generates desired torque by performing current-vector control based on an electric angle detected by an angle detector. Accordingly, the control performance of the current-vector control relies on the performance of the angle detector. To date, there has been disclosed an angle detector having a unit that detects an absolute angular signal having a resolution for dividing one electric-angle rotation into four sections and a unit that outputs a continuous-value relative angular signal in each of the four sections into which the one electric-angle rotation is divided (e.g., refer to Patent Document 1). In a magnetic encoder disclosed in Patent Document 1, an absolute angular signal and a relative angular signal are combined with each other, so that an electric angle having a high resolution can be detected.

Moreover, to date, there has been disclosed an angle detector having a unit that detects an absolute angular signal having a resolution for dividing one electric-angle rotation into six sections and a unit that outputs a relative angular signal for further dividing each of the six sections, into which the one electric-angle rotation has been divided, into eight sections (e.g., refer to Patent Document 2). In an angle detector disclosed in Patent Document 2, a four-step relative angular signal appears twice in each of six sections into which one electric-angle rotation is divided and the relative angular signal is incremented, so that eight-section division is realized. Moreover, an electric angular signal obtained from the absolute angular signal and the relative angular signal is corrected so that a high resolution is realized.

In each of the respective conventional angle detectors disclosed in Patent Documents 1 and 2, a Hall device is utilized to detect transition of the pattern in an encoded region.

PRIOR ART REFERENCE

Patent Literature

[Patent Document 1] Japanese Patent Application Laid-Open No. 2018-105757
[Patent Document 2] International Publication No. WO2008/020231

DISCLOSURE OF THE INVENTION

Problems to be Solved by the Invention

An angle detector for detecting the electric angle of an AC rotating machine is required to obtain a high-resolution angle. It is argued that the angle detector disclosed in Patent Document 1 can detect an electric angle having a high resolution by, as described above, combining an absolute angular signal and a relative angular signal. However, there is posed a problem that the angle detector is expensive because the relative angular signal has a continuous value, the configuration of a signal processing unit becomes complex and because the relative angular signal is susceptible to noise, a filter circuit is required.

In addition, in the case of the angle detector disclosed in Patent Document 2, the relative angular signal is obtained by incrementing a signal that has four steps and appears twice; therefore, at a time immediately after the start of angle detection, it is not made possible to distinguish the first signal and the second signal. Accordingly, there has been a problem that at a time immediately after the start of angle detection, the electric angular signal cannot be set to have a resolution higher than that of the absolute angular signal.

The present disclosure discloses a technology for solving the foregoing problems in conventional angle detectors; an objective thereof is to provide an angle detector that can obtain a high-resolution angle as soon as angle detection has been started.

Moreover, an objective of the present disclosure is to provide an AC-rotating-machine controller having an angle detector that can obtain a high-resolution angle as soon as angle detection has been started.

Furthermore, an objective of the present disclosure is to provide an electric power steering apparatus that includes an AC-rotating-machine controller having an angle detector that can obtain a high-resolution angle as soon as angle detection has been started, and that assists steering of a vehicle such as an automobile.

Means for Solving the Problems

An angle detector disclosed in the present disclosure can detect, as one electric-angle rotation corresponding to a one-period electric angle, a mechanical-angle range of one section out of sections obtained by dividing one mechanical-angle rotation corresponding to one rotation of a rotation axle into P sections (P is a natural number); the angle detector is characterized by including
  a magnet that is fixed on the rotation axle and has a first track including magnets magnetized in P pole-pairs and a second track including magnets magnetized in Q pole-pairs (Q is a positive even number the same as or larger than 2P),
  a first Hall device group that is disposed so as to face the magnet and that senses magnetic flux from the first track and then outputs a first Hall signal,
  a second Hall device group that is disposed so as to face the magnet and that senses magnetic flux from the second track and then outputs a second Hall signal,
  a first detection unit that outputs an M-step absolute angular signal corresponding to M angle sections obtained by dividing the one electric-angle rotation into M sections, based on the first Hall signal from the first Hall device group 13 (M is a positive even number),
  a second detection unit that outputs an N-step relative angular signal that divides each of the M angle sections, obtained by dividing an electric-angle range of the one electric-angle rotation into M sections, into N sections, based on the second Hall signal from the second Hall device group (N is a positive even number that is different from M), an angle calculation unit that divides the electric-angle range of the one electric-angle rotation into [M×N] sections and that calculates and outputs an [M×N]-step electric angular signal, based on the absolute angular signal and the relative angular signal, and an angle correction unit that outputs a correction angle supplemented so as to smooth the [M×N]-step electric angular signal.

An AC-rotating-machine controller disclosed in the present disclosure includes the angle detector and is characterized by being configured in such a way as to control an AC rotating machine, based on the correction angle.

An electric power steering apparatus disclosed in the present disclosure includes the AC-rotating-machine controller and is characterized by being configured in such a way that the AC rotating machine generates assist torque, based on steering torque caused by a driver.

Advantage of the Invention

The present disclosure makes it possible to provide an angle detector that can obtain a high-resolution angle as soon as angle detection has been started.

Moreover, the present disclosure makes it possible to provide an AC-rotating-machine controller including an angle detector that can obtain a high-resolution angle as soon as angle detection has been started.

Furthermore, the present disclosure makes it possible to provide an electric power steering apparatus that includes an AC-rotating-machine controller having an angle detector that can obtain a high-resolution angle as soon as angle detection has been started, and that assists steering of a vehicle such an automobile.

BRIEF DESCRIPTION OF THE DRAWINGS

FIGS. 8A, and 8B are a set of schematic diagrams representing an effect of a manufacturing error in an angle detector according to Embodiment 2;

BEST MODE FOR CARRYING OUT THE INVENTION

Embodiment 1

Figure 1A:
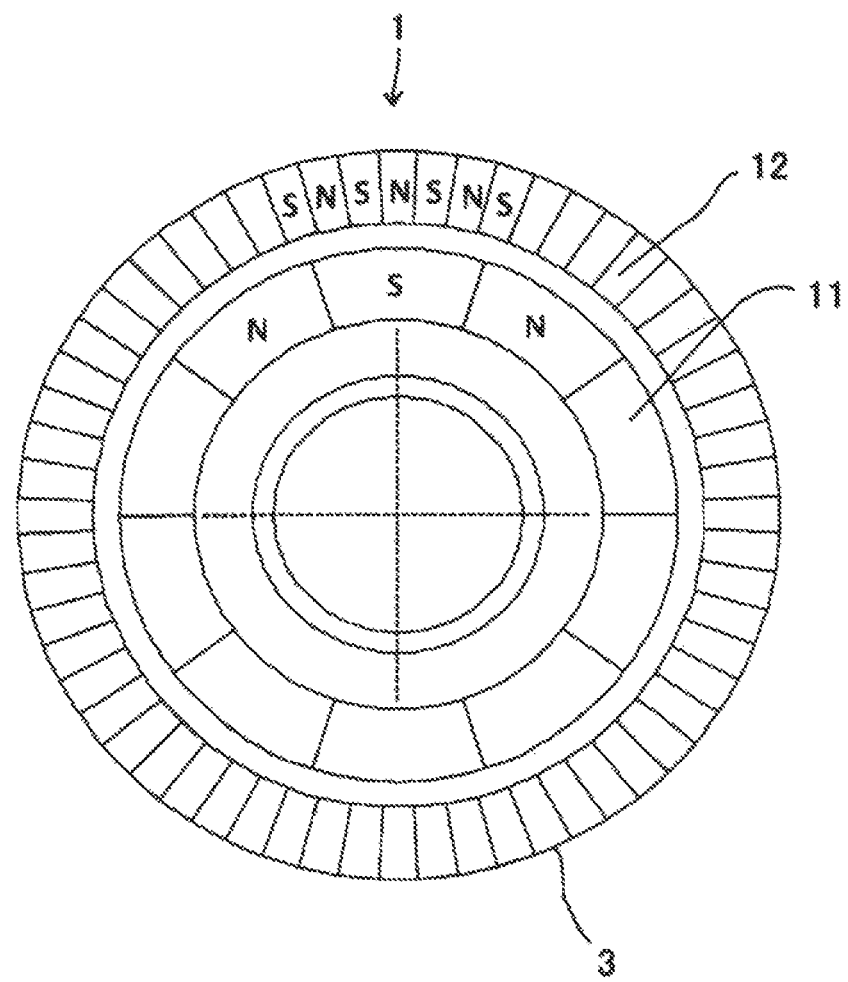
FIG. 1A is a configuration diagram representing part of an angle detector according to Embodiment 1.
Figure 1B:
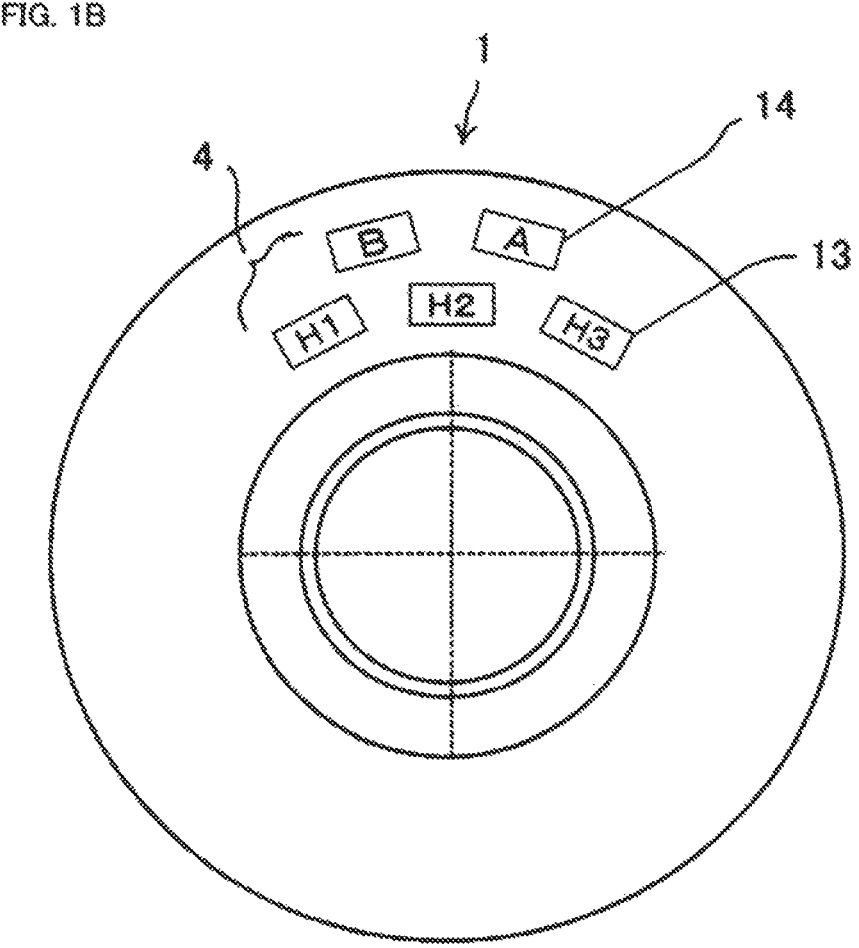
FIG. 1B is a configuration diagram representing another part of the angle detector according to Embodiment 1.
Figure 2:
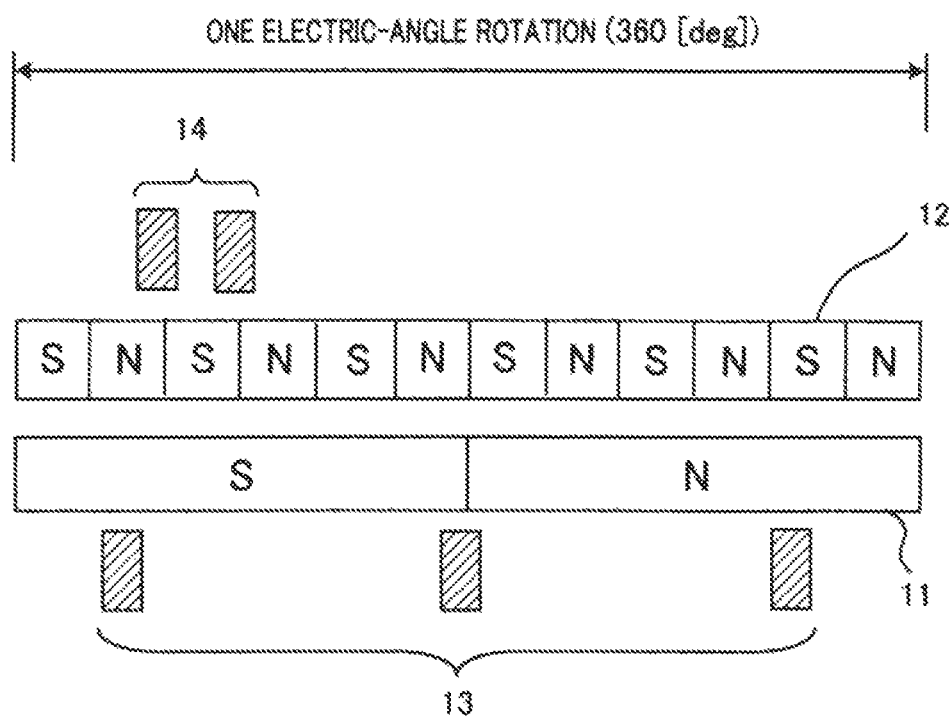
FIG. 2 is a schematic diagram representing Hall signals, extracted during one electric-angle rotation and expressed on respective straight lines, in the angle detector according to Embodiment 1.

Hereinafter, an angle detector according to Embodiment 1 will be explained in detail. FIG. 1A is a configuration diagram representing part of an angle detector according to Embodiment 1; FIG. 1B is a configuration diagram representing another part of the angle detector according to Embodiment 1. As illustrated in FIGS. 1A and 1B, an angle detector 1 has a discoidal magnet 3 fixed on the rotation axle of an AC rotating machine or the like and Hall devices 4 for sensing magnetic flux from the magnet 3. The Hall devices 4 are fixed at predetermined positions; the magnet 3 and the Hall devices 4 relatively move. The discoidal magnet 3 has a first track 11 and a second track 12.

In FIG. 1A, the first track 11 is formed of a ring-shaped magnet and is magnetized alternately to the N-pole and the S-pole in the circumferential direction thereof. Letting referring to adjacent N-pole and S-pole as a pole-pair, the first track 11 is magnetized to have totally P pole-pairs. P is a natural number. One mechanical-angle rotation includes two or more electric-angle rotations. For example, when five electric-angle rotations are included in 360°, which is one mechanical-angle rotation, P is 5. That is to say, letting referring to adjacent N-pole and S-pole as a pole-pair, magnetizing corresponding to five pole-pairs is made in one electric-angle rotation. The second track 12 is a ring-shaped magnet situated at the outer circumferential side of the first track 11 and is magnetized alternately to the N-pole and the S-pole in the circumferential direction thereof. Letting referring to adjacent N-pole and S-pole as a pole-pair, the second track 12 is magnetized to have totally Q pole-pairs. Q is an even number the same as or larger than 2P; in the present embodiment, Q is 30. That is to say, letting referring to adjacent N-pole and S-pole as a pole-pair, magnetizing corresponding to six pole-pairs is made in one electric-angle rotation.

In FIG. 1B, the Hall devices 4 for sensing magnetic flux from the magnet are arranged in such a way as to face the surface of the discoidal magnet 3 via a gap. The Hall devices 4 include a first Hall device group 13 that senses magnetic flux from the first track 11 of the magnet 3 and outputs a first Hall signal and a second Hall device group 14 that senses magnetic flux from the second track 12 of the magnet 3 and outputs a second Hall signal.

The first Hall device group 13 includes three Hall devices H1, H2, and H3. The Hall devices H1, H2, and H3 are circumferentially mounted in line in such a way as to be spaced apart from one another by 120° [electric angle]. For example, when one mechanical-angle rotation includes five electric-angle rotations, i.e., P is 5, the Hall devices H1, H2, and H3 are arranged in such a way that each of the distance between the Hall device H1 and the Hall device H2 and the distance between the Hall device H2 and the Hall device H3 is 24° [mechanical angle]. The second Hall device group 14 includes two Hall devices A and B. The respective Hall devices A and B are circumferentially arranged in such a way as to be spaced apart from each other by 15° [mechanical angle]. The second Hall device group 14 arranged at the outer circumferential side of the first Hall device group 13.

Figure 3:
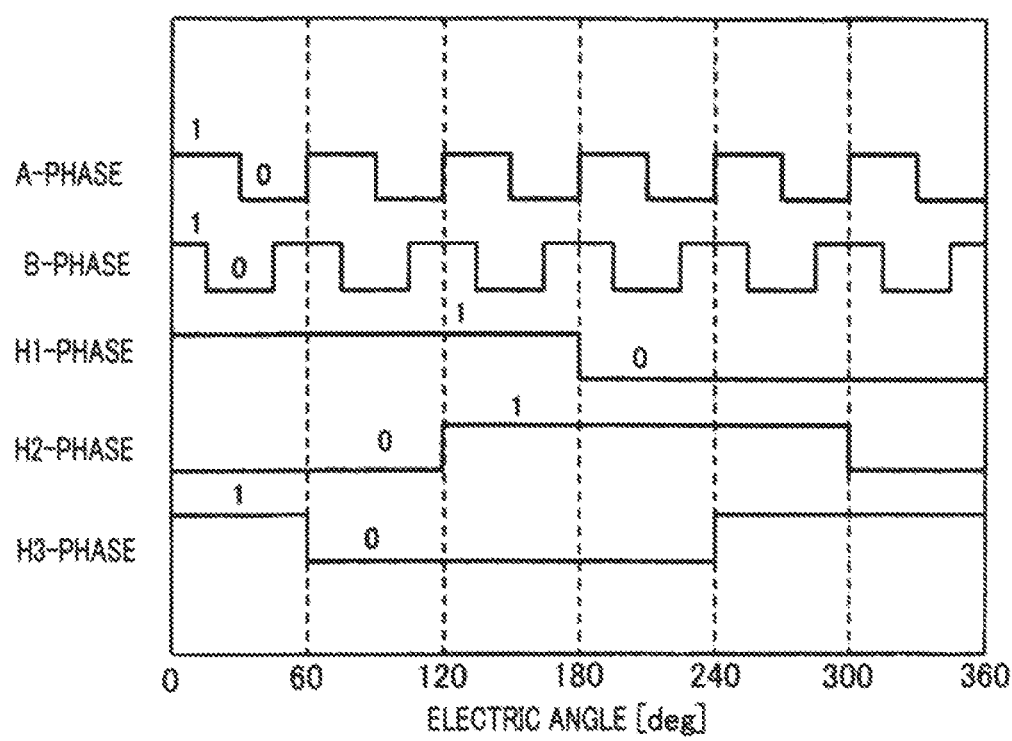
FIG. 3 is an explanatory chart representing the relationship between a first Hall signal and a second Hall signal with respect to the electric angle, in the angle detector according to Embodiment 1.

FIG. 3 is an explanatory chart representing the relationship between the first Hall signal and the second Hall signal with respect to the electric angle, in the angle detector according to Embodiment 1; the ordinate denotes A-phase and B-phase included in the after-mentioned first Hall signal and H1-phase, H2-phase, and H3-phase included in the after-mentioned second Hall signal, and the abscissa denotes the electric angle [deg].

Because fixed on the rotation axle, the magnet 3 rotates along with the rotation axle and moves relatively with respect to the Hall devices 4. As a result, each of the Hall devices H1, H2, and H3 in the first Hall device group 13 out of the Hall devices 4 senses respective magnetic flux lines of the N-pole and the S-pole in the first track 11 of the magnet 3; for example, when facing the N-pole and the S-pole, each of the Hall devices H1, H2, and H3 outputs a value "1" and "0", respectively, and continuously outputs these values in an alternate manner. Because a phase difference of 120° [electric angle] exists between the Hall device H1 and the Hall device H2 and a phase difference of 120° [electric angle] exists between the Hall device H2 and the Hall device H3, the first Hall device group 13 outputs signals that each have a value "0" or "1" and whose phases are different from one another by 120° [electric angle].

In this situation, the signals outputted from the first Hall device group 13 will be referred to as the first Hall signals. The first Hall signals include three signals, i.e., an H1-phase signal from the Hall device H1, an H2-phase signal from the Hall device H2, and an H3-phase signal from the Hall device H3. In the following explanation, the H1-phase signal, the H2-phase signal, and the H3-phase signal will be described simply as H1-phase, H2-phase, and H3-phase, respectively.

Each of the Hall devices A and B in the second Hall device group 14 out of the Hall devices 4 senses respective magnetic flux lines of the N-pole and the S-pole in the second track 12 of the magnet 3; for example, when facing the N-pole and the S-pole, each of the Hall devices A and B outputs a value "1" and "0", respectively, and continuously outputs these values in an alternate manner. Because a phase difference of 90° [electric angle] exists between the Hall device A and the Hall device B, the second Hall device group 14 outputs signals that each have a value "O" or "2" and whose phases are different from each other by 90° [electric angle].

In this situation, the signals outputted from the second Hall device group 14 will be referred to as the second Hall signals. The second Hall signals include an A-phase signal from the Hall device A and a B-phase signal from the Hall device B. In the following explanation, the A-phase signal and the B-phase signal will be described simply as A-phase and B-phase, respectively.

Figure 4:
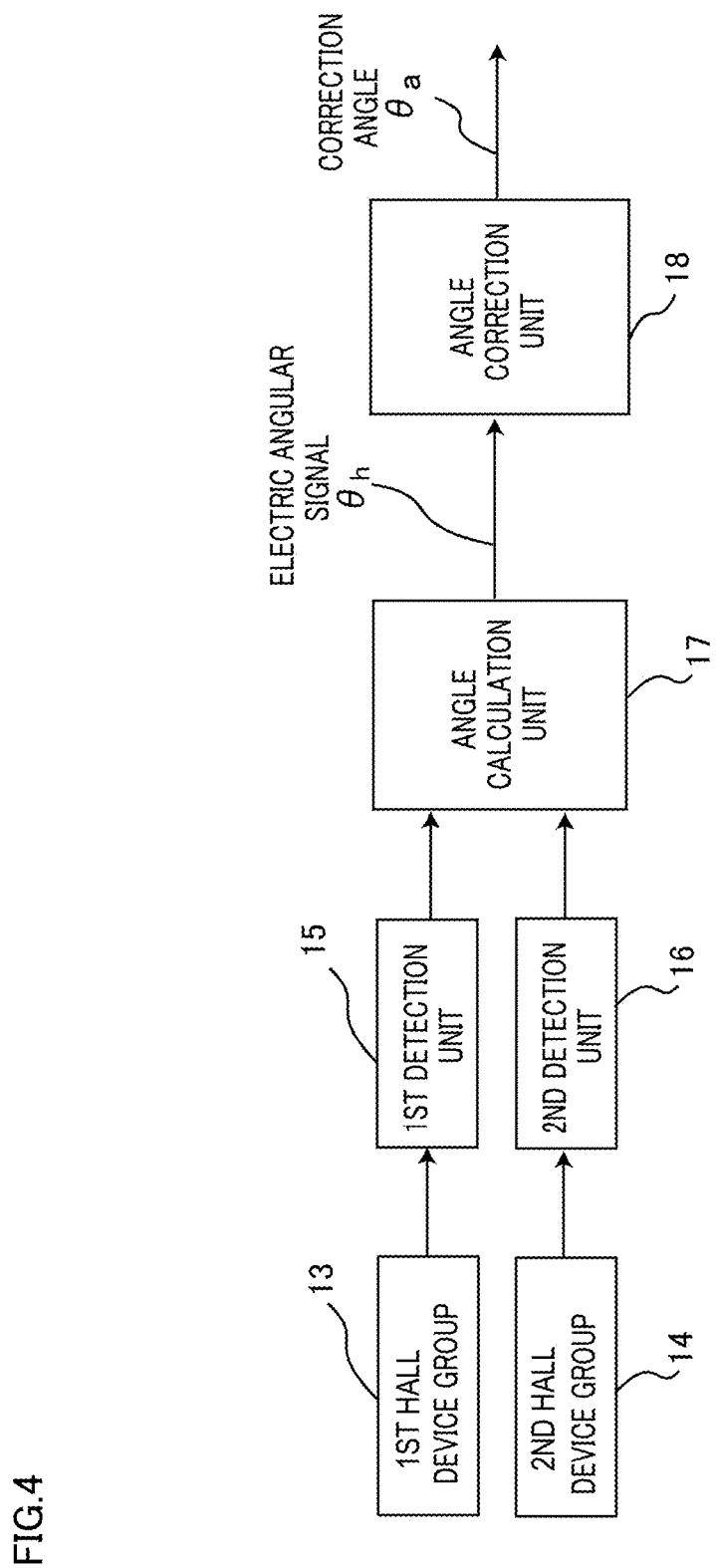
FIG. 4 is a block diagram representing the configuration of an angle calculation unit for calculating a correction angle, in the angle detector according to Embodiment 1.
Figure 5A:
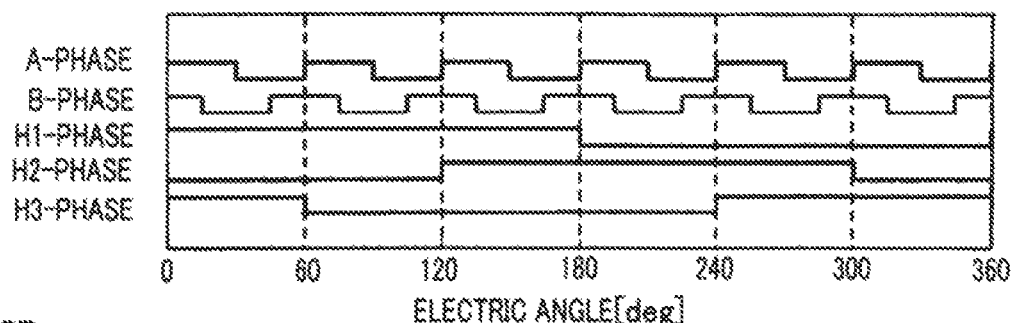
FIGS. 5A, 5B, 5C, and 5D are a set of explanatory charts representing the respective relationships between the electric angle and each of signals in the angle detector according to Embodiment 1.
Figure 5B:
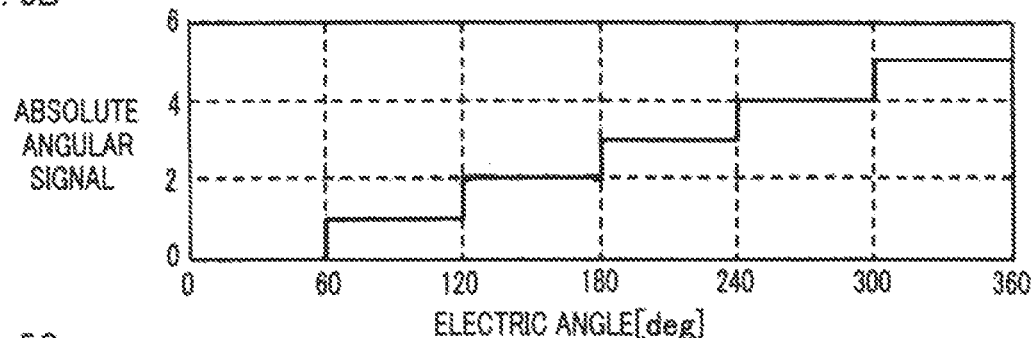
Figure 5C:
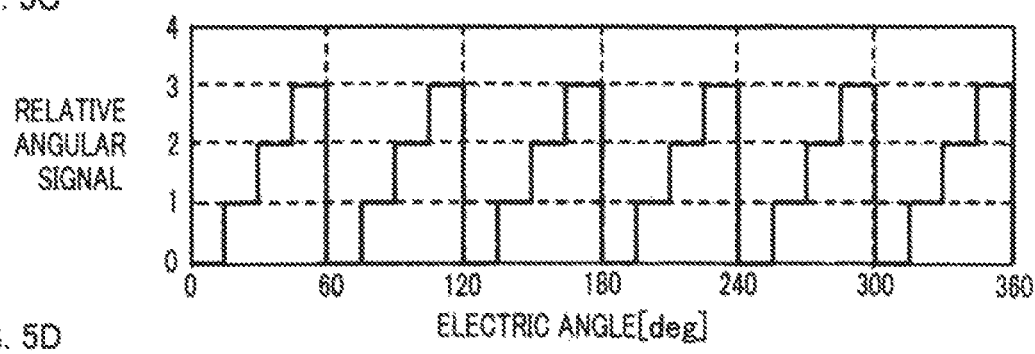
Figure 5D:
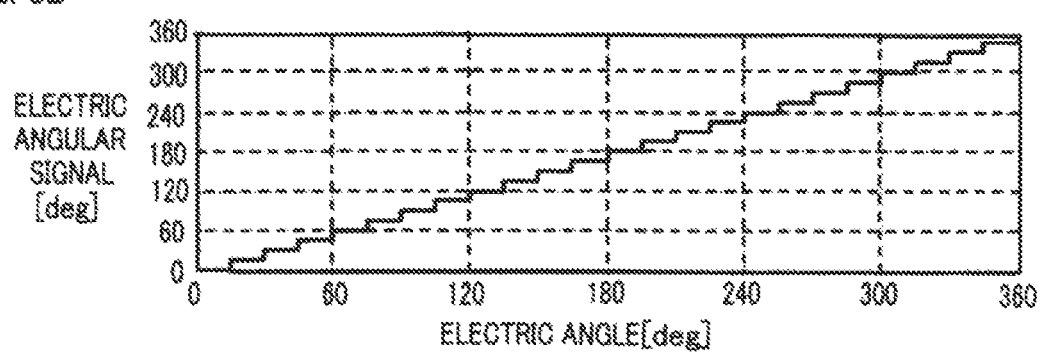

FIG. 4 is a block diagram representing the configuration of an angle calculation unit for calculating a correction angle, in the angle detector according to Embodiment 1. FIGS. 5A, 5B, 5C, and 5D are a set of explanatory charts each representing the relationship between the electric angle and a signal in the angle detector according to Embodiment 1; FIG. 5A represents H1-phase, H2-phase, and H3-phase, as the first Hall signals, and A-phase and B-phase, as the second Hall signals; FIGS. 5B, 5C and 5D represent an absolute angular signal, a relative angular signal, and an electric angular signal, respectively. FIGS. 5A, 5B, 5C, and 5D represent the respective signals in one period of 360° [electric angle]. In the following explanation, an electric angle of 360° will be referred to as one electric-angle rotation and a mechanical angle of 360° will be referred to as one mechanical-angle rotation.

In FIGS. 4, 5A, 5B, 5C and 5D, based on H1-phase, H2-phase, and H3-phase, as the first Hall signals from the first Hall device group 13, a first detection unit 15 outputs an M-step absolute angular signal-one electric-angle rotation is divided into M sections. M is a positive even number. Based on A-phase and B-phase, as the second Hall signals from the second Hall device group, a second detection unit 16 outputs an N-step relative angular signal—each of the sections obtained by dividing one electric-angle rotation into M sections is divided into N sections. N is a positive even number.

In this situation, the first track 11 has 5 pole-pairs per mechanical-angle rotation and 1 pole-pair per electric-angle rotation. In addition, the number m of devices in the first Hall device group 13 is 3[m=3]. In this situation, M=2 m=6. In addition, the second track 12 has 30 pole-pairs per mechanical-angle rotation (Q=30) and 6 pole-pairs per electric-angle rotation. "6 pole-pairs per electric-angle rotation" is equal to M. In addition, the number n of devices in the second Hall device group 14 is 2[n=2]. In this situation, N=2n=4.

As represented in FIG. 5B, the absolute angular signal to be outputted by the first detection unit 15 is a 6-step signal-one electric-angle rotation is divided into 6 sections; the value thereof is any one of "0", "1", "2", "3", "4", and "5". As represented in FIG. 5C, the relative angular signal to be outputted by the second detection unit 16 is a 4-step signal—each of the sections obtained by dividing one electric-angle rotation into 6 sections is further divided into 4 sections; the value thereof is any one of "0", "1", "2", and "3".

Based on the absolute angular signal and the relative angular signal, an angle calculation unit 17 divides one electric-angle rotation into [M×N] sections and calculates an [M×N]-step electric angular signal. Because an M-step signal and an N-step signal are combined, an [M×N]-step signal can be outputted. Because M is 6 and N is 4, M×N=24. Because one electric-angle rotation, i.e., 360° is divided into 24 sections, a 15°-resolution stepped electric angular signal is outputted, as represented in FIG. 5D.

Figure 6A:
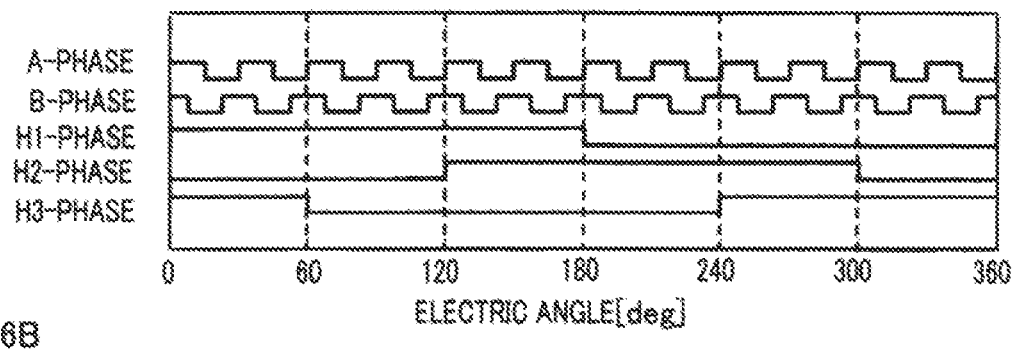
FIGS. 6A, 6B, 6C, and 6D are a set of explanatory charts representing the respective relationships between the electric angle and each of signals in a conventional angle detector.
Figure 6B:
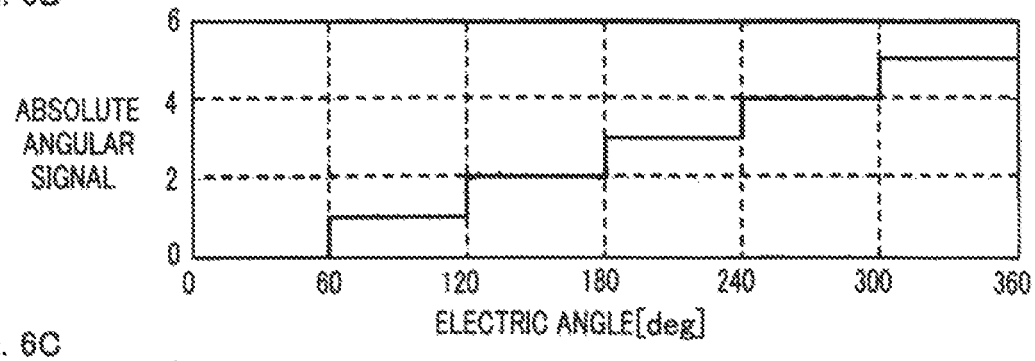
Figure 6C:
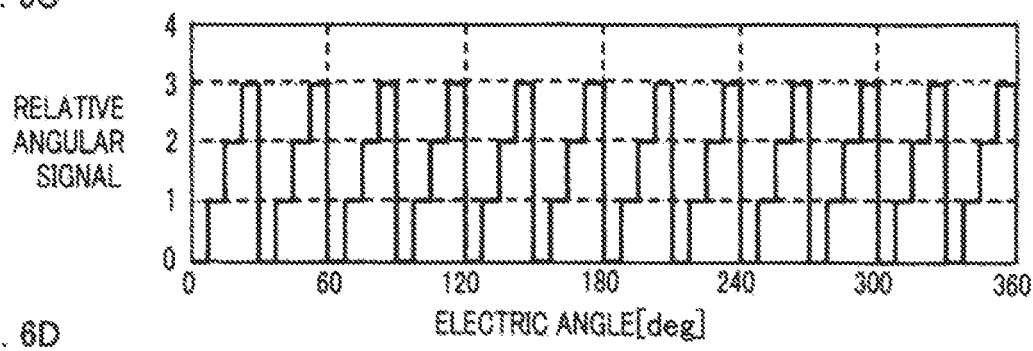
Figure 6D:
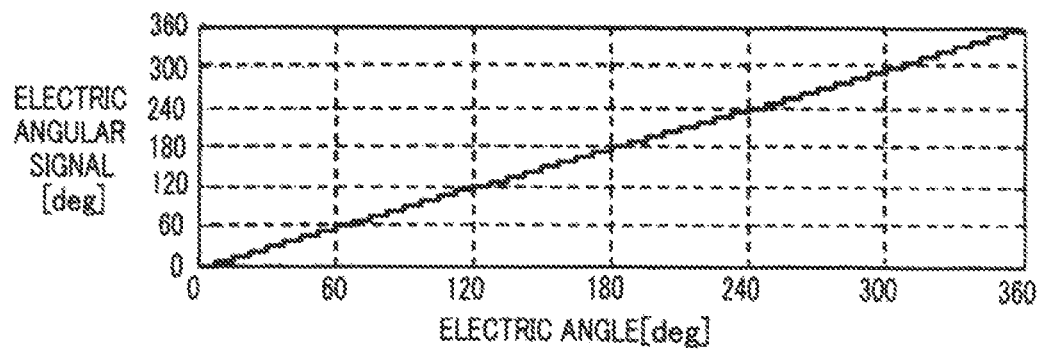

In this situation, the M-step signal and the N-step signal, which is one of the characteristics of the present disclosure, will be explained. FIGS. 6A, 6B, 6C and 6D are a set of explanatory charts each representing the relationship between the electric angle and a signal in a conventional angle detector; FIG. 6A represents H1-phase, H2-phase, and H3-phase, as the first Hall signals, and A-phase and B-phase, as the second Hall signals; FIG. 6B represents an absolute angular signal; FIG. 6C represents a relative angular signal; FIG. 6D represents an electric angular signal. FIGS. 6A, 6B, 6C, and 6D represent the respective signals in 360°, which is one electric-angle rotation. As an example of conventional angle detectors, FIGS. 6A, 6B, 6C, and 6D represent a set of signals obtained through the configuration in FIG. 3 of Patent Document 2.

In the conventional technology according to Patent Document 2, as represented in FIG. 6B, an absolute angular signal having 6 steps is outputted, as is the case with Embodiment 1 of the present disclosure—one electric-angle rotation is divided into 6 sections. As is the case with Embodiment 1 of the present disclosure, the relative angular signal represented in FIG. 6C has 4 steps; however, each of the sections obtained by dividing one electric-angle rotation into 6 sections is further divided into 8 sections. In other words, the 4-step relative angular signal appears twice in each of the sections obtained by dividing one electric-angle rotation into 6 sections. In this conventional technology, a division number larger than the number of patterns of the relative angular signal is realized by incrementing the relative angular signal. However, because one and the same relative angular signal appears twice in each of the sections obtained by dividing one electric-angle rotation into 6 sections, it cannot be determined whether the signal is the first signal or the second signal. That is to say, the initial angle at a time immediately after the start of angle detection cannot be set to have a resolution higher than the low resolution of the absolute angular signal.

In contrast, in Embodiment 1 of the present disclosure, the relative angular signal is a 4-step signal—each of the sections obtained by dividing one electric-angle rotation into 6 sections is divided into 4 sections. Accordingly, the electric angular signal is uniquely determined by a combination of the absolute angular signal and the relative angular signal. Thus, the initial angle at a time immediately after the start of angle detection cannot be set to have a resolution higher than the conventional resolution.

In this situation, the main point is that when the number Q of pole-pairs in the second track is configured in such a way that the relationship [Q=2 mP=MP] is established, no increment is required and hence a high-resolution electric angular signal can be set as soon as angle detection has been started; therefore, the relationship will be explained. The absolute angular signal to be outputted by the first detection unit 15 represented in FIG. 4 is an M-step signal-one electric-angle rotation is divided into M sections. The number of pole-pairs per electric-angle rotation in the first detection unit 15 is 1 pole-pair; the number of Hall devices is m. Because 1 pole-pair consists of 2 poles, a 2 m-step signal can be realized—one electric-angle rotation is divided into 2 m sections. That is to say, M is 2 m.

The relative angular signal to be outputted by the second detection unit 16 is an N-step signal—each of the sections obtained by dividing one electric-angle rotation into M sections is further divided into N sections. In this situation, a portion, corresponding to only 1 pole-pair, of the second track 12 represented in FIG. 1A is magnetized, so that it is made possible that one and the same relative angular signal does not recurrently occurs. That is to say, because one and the same relative angular signal does not recurrently occurs, no increment is required; thus, a high-resolution electric angular signal can be set as soon as angle detection has been started. Because the number of the Hall devices is n, a 2n-step signal can be realized—each of the sections obtained by dividing one electric-angle rotation into M sections is divided into 2n sections. That is to say, N is 2n. A portion, corresponding to only 1 pole-pair, of the second track 12 is magnetized in each of the sections obtained by dividing one electric-angle rotation into 2 m sections; thus, in one mechanical-angle rotation, [2 m×P=2 mP] poles are realized. In other words, the number Q of pole-pairs in the second track 12 is 2 mP.

The first track 11 represented in FIG. 1A has P pole-pairs in one mechanical-angle rotation, and the number of Hall devices in the first Hall device group 13 is m. Accordingly, the first detection unit 15 obtains an absolute angular signal having a resolution corresponding to 2 mP sections in one mechanical-angle rotation. That is to say, because the division number of the absolute angular signal with respect to the mechanical angle and the number Q of pole-pairs in the second track 12 are made to be equal to each other, no increment is required; thus, a high-resolution electric angular signal can be set as soon as angle detection has been started. In Embodiment 1, Q is 6P. When this relationship is established, an [M×N]-step electric angular signal can be outputted by combining an M-step signal and an N-step signal. Thus, an electric angular signal having a high resolution of $[360/(M\times N)]°$ can be obtained as soon as angle detection has been started.

The angle calculation unit 17 in FIG. 4 calculates and outputs an electric angular signal $\theta h$, based on the absolute angular signal from the first detection unit 15 and the relative angular signal from the second detection unit 16. As the calculation method, it may be allowed to utilize either a function of the absolute angular signal and the relative angular signal or a map. In the case where a function is utilized, the calculation is performed, for example, according to the equation $[\theta h=(\Delta\theta 1\times i)+(\Delta\theta 2\times j)]$. In the above equation, $\Delta\theta 1$ is the resolution of the absolute angular signal; $\Delta\theta 2$ is the resolution of the electric angular signal $\theta h$; i is an absolute angular signal from "0" to "5"; j is a relative angular signal from "0" to "3"; $\Delta\theta 1$ is 60°; $\Delta\theta 2$ is 15°.

The angle calculation unit 17 may be configured in such a way as to add a preliminarily set offset value to the electric angular signal and outputs a new electric angular signal. The offset value is not limited to one value; it may be set in accordance with a Hall-sensor angle, a mechanical angle, a rotation speed, or the like, by use of a preliminarily set map or a function. As a result, an angular error caused by a manufacturing error or a delay in angle detection can be corrected.

Figure 7:
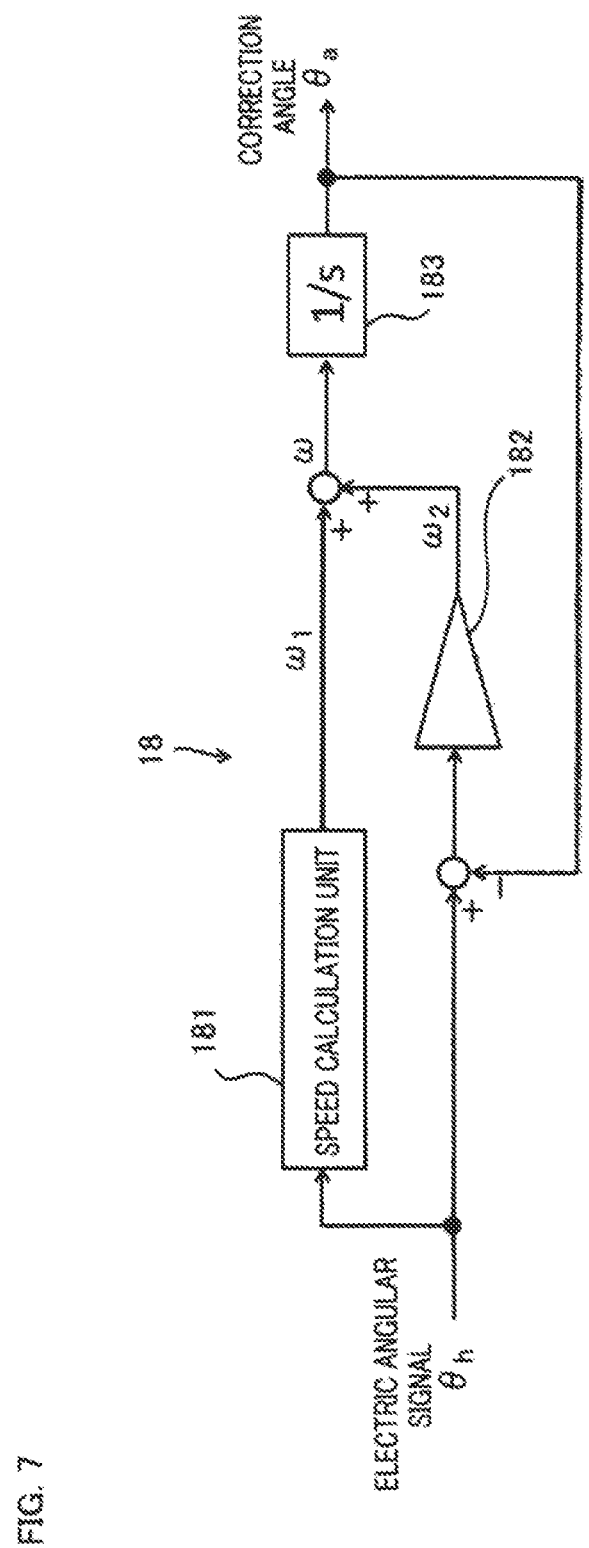
FIG. 7 is a block diagram representing an angle correction unit in the angle detector according to Embodiment 1.

Next, an angle correction unit 18 will be explained. FIG. 7 is a block diagram representing the configuration of an angle correction unit in the angle detector according to Embodiment 1. In FIG. 7, the angle correction unit 18 has a speed calculation unit 181, a PI controller 182, and an integrator 183. The speed calculation unit 181 calculates a first speed $\omega 1$ from a time T at which the relative angular signal from the second detection unit 16 changes, and outputs the first speed $\omega 1$; the PI controller 182 calculates and outputs a second speed $\omega 2$, based on a difference between a correction angle da and the electric angular signal $\theta h$; the integrator 183 integrates the sum of the first speed $\omega 1$ and the second speed $\omega 2$ so as to calculate the correction angle $\theta a$, and outputs the correction angle $\theta a$. As a result, the angle correction unit 18 outputs the correction angle $\theta a$, which is supplemented so as to smooth the stepped electric angular signal $\theta h$. The correction of the angle smooths the stepped electric angular signal obtained through division of the electric angle 360° into [M×N] sections, so that a higher-resolution angle can be obtained.

Because unlike the conventional technology, the relative angular signal is not repeated several times in the section obtained by dividing one electric-angle rotation into M sections, the resolution in Embodiment 1 is lower than that in the conventional technology. However, because the angle correction unit 18 is provided, the stepped electric angular signal can be smoothed and hence a high-resolution angle can be obtained; thus, the resolution is not low in comparison with the conventional technology.

The stepped electric angular signal may be smoothed by use of a lowpass filter, a moving-average method, or the like; however, as described later, in the case where the resolution of the electric angular signal is low, the correction angle for the real electric angle can be calculated with a smaller error by use of the first speed $\omega 1$ and the second speed $\omega 2$ obtained by two kinds of calculation methods.

In the angle correction unit 18, at first, the first speed $\omega 1$ corresponding to the speed of the electric angle is calculated from a time T during which the relative angular signal changes. The first speed $\omega 1$ corresponding to the speed of the electric angle is calculated by use of an angle changing amount $\Delta\theta h$ and the time T during which the relative angular signal changes, i.e., according to the equation $[\omega 1 = \Delta\theta h/T]$. The angle changing amount $\Delta\theta h$ is a value corresponding to the resolution of the electric angular signal; $\Delta\theta h$ is $15°$.

Even when the time T during which the relative angular signal changes is obtained from the second Hall signal, the same effect can be obtained. For example, a time T2 from the rise of A-phase to the fall of B-phase is equal to the time T during which the relative angular signal changes; therefore, when the first speed $\omega 1$ is calculated under the condition $[T=T2]$, the same effect can be obtained.

In the case where a time T3 from the rise of A-phase to the fall of the A-phase is utilized, it is only necessary that the first speed $\omega 1$ is calculated under the condition $[T=T3/2]$. In the case where a time T4 from the rise of A-phase to the next rise of the A-phase is utilized, it is only necessary that the first speed $\omega 1$ is calculated under the condition $[T=T4/4]$.

Next, the second speed $\omega 2$ is calculated, based on a difference between the correction angle $\theta a$ and the electric angular signal $\theta h$. Specifically, the second speed $\omega 2$ is calculated by inputting the difference between the correction angle $\theta a$ and the electric angular signal $\theta h$ to the PI controller 182, as a proportional integral controller. The correction angle $\theta a$ is calculated by integrating a speed $\omega$, which is the sum of the first speed $\omega 1$ and the second speed $\omega 2$.

In this situation, the stepped electric angular signal can further be smoothed by reducing the control gain of the PI controller 182 as a proportional integral controller. However, because the correction angle is delayed from the real electric angle, the error of the correction angle with respect to the real electric angle becomes large. Therefore, the first speed $\omega 1$ and the second speed $\omega 2$ obtained by two kinds of calculation methods are utilized, so that the delay of the second speed $\omega 2$ can be compensated by the first speed $\omega 1$; thus, the error of the correction angle with respect to the real electric angle can be decreased.

As described above, an angle detector according to Embodiment 1 is provided with the configuration of any one of (1) through (4).
(1) An angle detector that can detect, as one electric-angle rotation corresponding to a one-period electric angle, a mechanical-angle range of one section out of sections obtained by dividing one mechanical-angle rotation corresponding to one rotation of a rotation axle into P sections (P is a natural number), the angle detector comprising:
    a magnet that is fixed on the rotation axle and has a first track including magnets magnetized in P pole-pairs and a second track including magnets magnetized in Q pole-pairs (Q is a positive even number the same as or larger than 2P);

a first Hall device group that is disposed so as to face the magnet and that senses magnetic flux from the first track and then outputs a first Hall signal;
    a second Hall device group that is disposed so as to face the magnet and that senses magnetic flux from the second track and then outputs a second Hall signal;
    a first detection unit that outputs an M-step absolute angular signal corresponding to M angle sections obtained by dividing the one electric-angle rotation into M sections, based on the first Hall signal from the first Hall device group 13 (M is a positive even number);
    a second detection unit that outputs an N-step relative angular signal that divides each of the M angle sections, obtained by dividing an electric-angle range of the one electric-angle rotation into M sections, into N sections, based on the second Hall signal from the second Hall device group (N is a positive even number that is different from M);
    an angle calculation unit that divides the electric-angle range of the one electric-angle rotation into [M×N] sections and that calculates and outputs an [M×N]-step electric angular signal, based on the absolute angular signal and the relative angular signal; and
    an angle correction unit that outputs a correction angle supplemented so as to smooth the [M×N]-step electric angular signal.

In the angle detector according to this configuration, an electric angular signal, which is an absolute angle, is calculated based on an N-step relative angular signal obtained through division of each of M sections into N sections; thus, an electric angular signal having a high resolution of $[360/(M\times N)]°$ can be obtained as soon as angle detection has been started. Moreover, the correction of an electric angular signal smooths the electric angular signal obtained through division of 360° into [M×N] sections, so that a higher-resolution angle can be obtained.

Furthermore, the first Hall device group 13 has m Hall devices, and the number Q of pole-pairs in the second track 12 is 2 mP. The first Hall device group 13 has three Hall devices; the second Hall device group 14 has two Hall devices; the number Q of pole-pairs in the second track 12 is 6P. By configuring the angle detector in such a manner as described above, an electric angular signal having a high resolution of $[360/(M\times N)]°$ can be obtained as soon as angle detection has been started.

The angle correction unit 18 calculates a first speed from a time during which the relative angular signal changes, calculates a second speed based on a difference between the correction angle and the electric angular signal, and then integrates a sum of the first speed and the second speed so as to calculate the correction angle. In the foregoing configuration, the correction angle is calculated by use of speeds calculated through two kinds of calculation methods, so that there can be obtained an additional effect that an angular error can be reduced. The correction of the angle smooths the electric angular signal obtained through division of 360° into [M×N] sections, so that a higher-resolution angle can be obtained.
(2) The angle detector including the configuration according to foregoing (1),
    wherein the first Hall device group has m Hall devices (m is a natural number), and
    wherein the number Q of pole-pairs in the second track is 2 mP.

In the angle detector including the foregoing configuration, an electric angular signal having a high resolution of [360°/(M× N)] can be obtained as soon as angle detection has been started.

(3) The angle detector including the configuration according to any one of (1) and (2), wherein the first Hall device group has three Hall devices, wherein the second Hall device group has two Hall devices, and wherein the number Q of pole-pairs in the second track is 6P.

In the angle detector including the foregoing configuration, an electric angular signal having a high resolution of [360°/(M×N)] can be obtained as soon as angle detection has been started.

(4) The angle detector including the configuration according to any one of foregoing (1) through (3), wherein the angle correction unit calculates a first speed from a time during which the relative angular signal changes, calculates a second speed based on a difference between the correction angle and the electric angular signal, and then integrates a sum of the first speed and the second speed so as to calculate the correction angle.

In the angle detector including the foregoing configuration, the correction of the angle smooths the electric angular signal obtained through division of 360° into [M×N] sections, so that a higher-resolution angle can be obtained.

Embodiment 2

Next, an angle detector according to Embodiment 2 will be explained. In Embodiment 2 of the present disclosure, the configuration of the angle calculation unit is different from the configuration of the angle calculation unit of Embodiment 1; however, the other configurations are the same as those of Embodiment 1. Specifically, the angle calculation unit according to Embodiment 2 is different from the angle calculation unit according to Embodiment 1 in that it is provided with an initial angle setting unit. FIGS. 8A and 8B are a set of schematic diagrams representing an effect of a manufacturing error in the angle detector according to Embodiment 2; FIG. 8A represents a case where no manufacturing error exists; FIG. 8B represents a case where a manufacturing error exists and hence the reference position of H1-phase, H2-phase, and H3-phase and the reference position of A-phase and B-phase are not aligned with each other. In this situation, the absolute angular signal takes a value from "0" through "5" and is described as h0, h1, – – –, and h5 (unillustrated) in FIGS. 8A and 8B. The relative angular signal takes a value from "0" through "3" and is described as a0, a1, and a3 in FIGS. 8A and 8B. The electric-angle pattern is a value from "1" through "[M×N]" and corresponds to an electric angular signal from 0° through 345°.

In the case where as represented in FIG. 8A, no manufacturing error exists, an appropriate electric-angle pattern can be detected based on the absolute angular signal and the relative angular signal; thus, an appropriate electric angular signal can be set. However, in the case where as represented in FIG. 8B, a manufacturing error exists, the reference position of H1-phase, H2-phase, and H3-phase and the reference position of A-phase and B-phase are not aligned with each other and hence an erroneous electric-angle pattern is detected; thus, an erroneous electric angular signal is set.

In the case where as represented in FIG. 8A, no manufacturing error exists, the electric-angle pattern becomes "5" in a region where the absolute angular signal is h1 and the relative angular signal is a0. However, when as represented in FIG. 8B, a manufacturing error exists, a section where the absolute angular signal is h1 and the relative angular signal is a3 occurs even in the same region; because from the combination, the electric-angle pattern becomes "8", an erroneous electric angular signal is set. Accordingly, in Embodiment 2, the angle calculation unit 17 has the initial angle setting unit; the initial angle setting unit prevents an erroneous electric angular signal from being set due to a manufacturing error.

Figure 9:
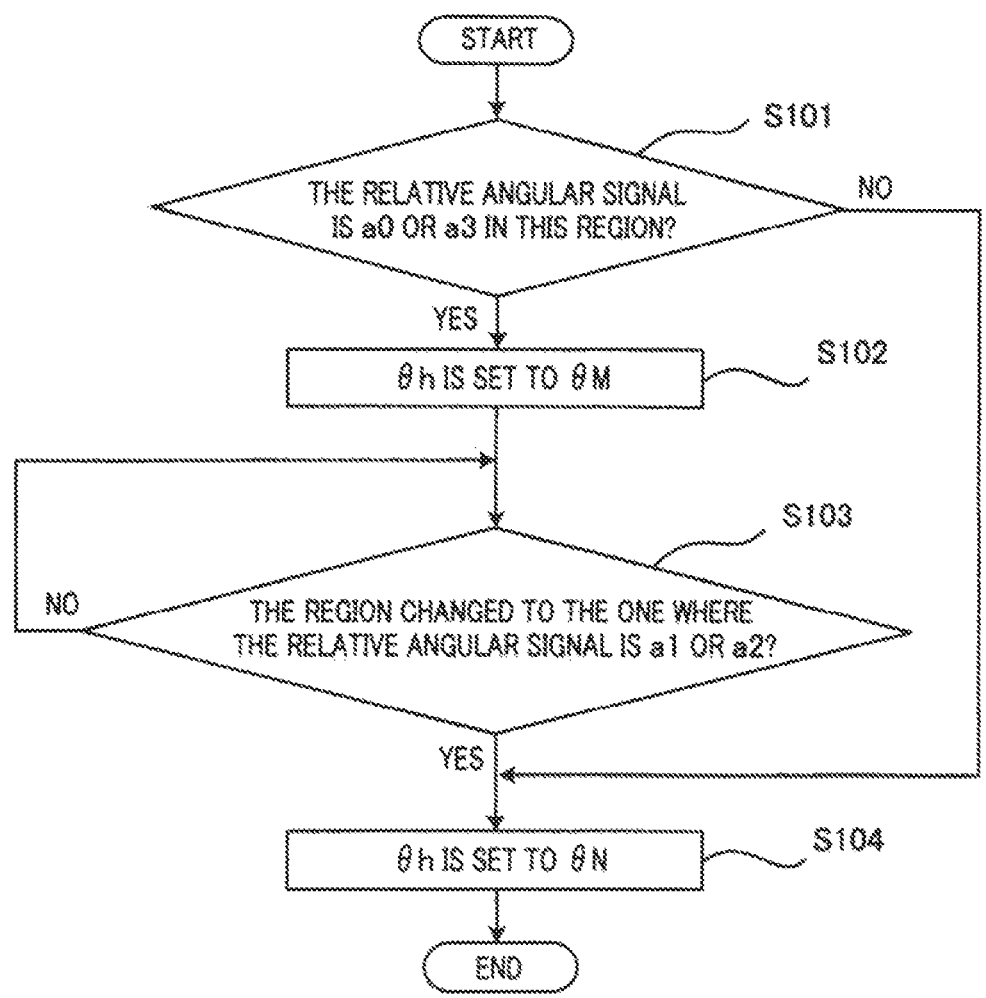
FIG. 9 is a flowchart representing the operation of an initial angle setting unit in the angle detector according to Embodiment 2.

FIG. 9 is a flowchart representing the operation of the initial angle setting unit in the angle detector according to Embodiment 2. In this situation, it is defined that an angle selected from M-step angles, obtained by dividing one electric-angle rotation into M sections, based on the absolute angular signal is OM. It is defined that an angle selected from [M×N]-step angles, obtained by further dividing the section, obtained by dividing one electric-angle rotation into M sections, into N sections, based on the absolute angular signal and the relative angular signal is ON. The relative angular signals a0 and a3 represented in foregoing FIGS. 8A and 8B correspond to the first relative angular signal and the Nth relative angular signal, respectively.

When the relative angular signal corresponds to the first one or the Nth one, the foregoing error in the electric angular signal occurs; thus, in the step S101 in FIG. 9, it is determined whether the present region is the region where the relative angular signal is a0 or a3. In the case where it is determined in the step S101 that the present region is the region where the relative angular signal is a0 or a3 (YES), the step S101 is followed by the step S102, where the electric angular signal θh is set to OM. As a result, the error in the electric angular signal can be prevented. In contrast, in the case where it is determined in the step S101 that the present region is not the region where the relative angular signal is a0 or a3 (NO), the step S101 is followed by the step S104, where the electric angular signal θh is set to ON.

After the electric angular signal has been set in the step S102, the step S102 is followed by the step S103, where it is determined whether the present region has changed to the region where the relative angular signal is a1 or a2. In the case where it is determined in the step S103 that the present region has changed to the region where the relative angular signal is a1 or a2 (YES), the electric angular signal θh is set to ON. In contrast, in the case where it is determined in the step S103 that the present region has not changed to the region where the relative angular signal is a1 or a2 (NO), the determination in the step S103 is repeated until the present region changes to the region where the relative angular signal is a1 or a2.

Figure 10:
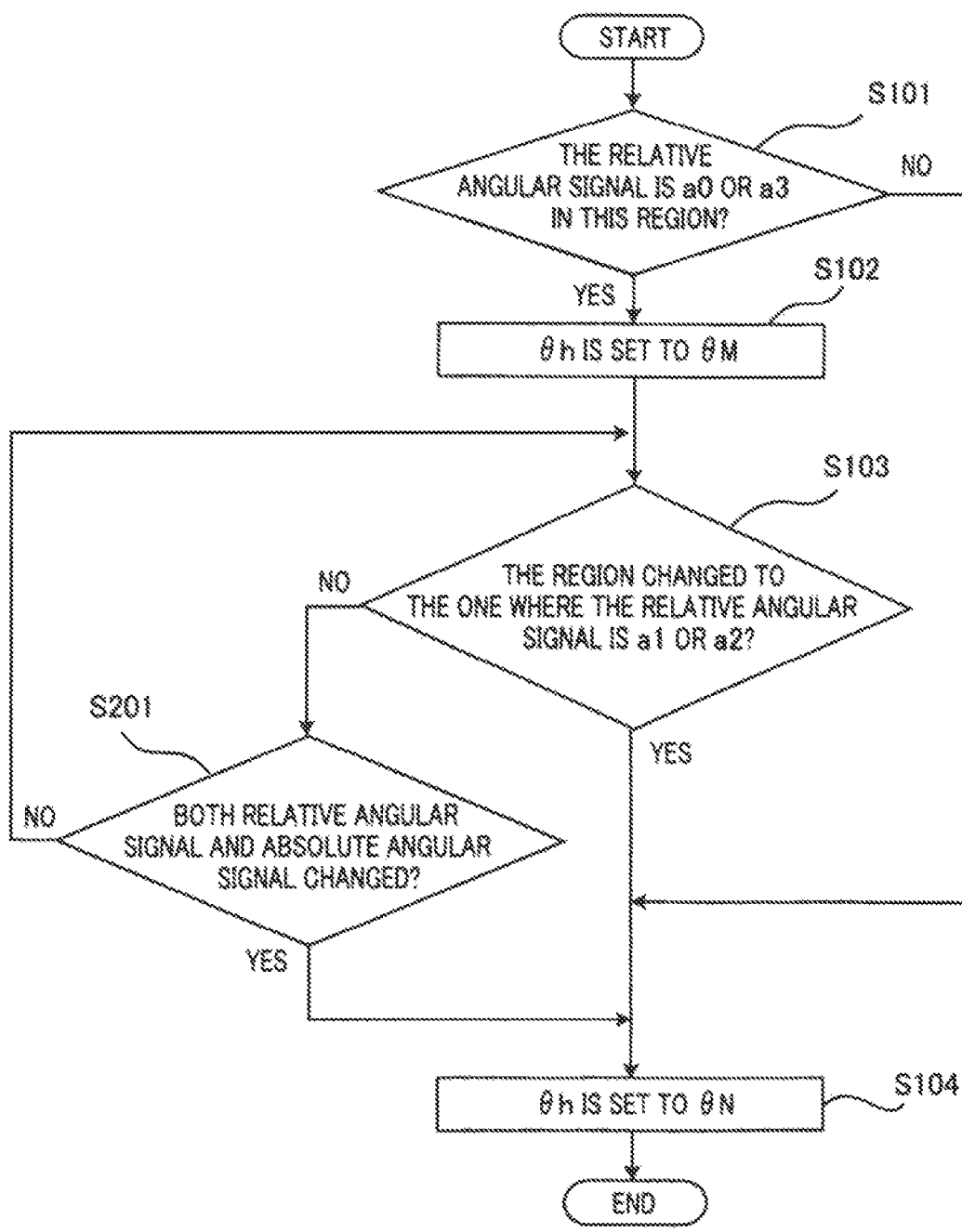
FIG. 10 is a flowchart representing the operation of a variant example of the initial angle setting unit in the angle detector according to Embodiment 2.

The initial angle setting unit may be configured in such a manner as described below. That is to say, FIG. 10 is a flowchart representing the operation of a variant example of the initial angle setting unit in the angle detector according to Embodiment 2. In the variant example of Embodiment 2, the processing contents after and including the step S103 are different from those in FIG. 9; however, the other processing contents are the same as those in FIG. 9.

In FIG. 10, in the case where it is determined in the step S103 that the present region has changed to the region where the relative angular signal is a1 or a2 (YES), the step S103 is followed by the step S104, where the electric angular signal θh is set to ON. In contrast, in the case where it is determined in the step S103 that the present region has not changed to the region where the relative angular signal is a1 or a2 (NO), it is determined in the step S201 whether or not both the relative angular signal and the absolute angular signal have changed; in the case where it is determined that both the relative angular signal and the absolute angular signal have changed (YES), the step S201 is followed by the step S104, where the electric angular signal θh is set to θN. In contrast, in the case where it is determined in the step S201 that both the relative angular signal and the absolute angular signal have not changed (NO), the step S103 is resumed; then, the foregoing determination is repeated.

In the variant example of Embodiment 2, represented in FIG. 10, the determination processing in the step S201 is added; thus, it is made possible to more quickly set the electric angular signal θh to θN in the step S104.

As described above, in Embodiment 2, the angle calculation unit is provided with the initial angle setting unit that sets one angle out of M angles obtained by dividing one electric-angle rotation into M sections to an initial angle, when among N relative angular signals, the first one or the Nth one is detected; thus, because it is made possible to prevent an error in the electric angular signal from being caused by a manufacturing error, an angular error can be suppressed. Moreover, in the case where among N relative angular signals, any one of the second through (N−1)th relative angular signals is detected, the electric angular signal can be set to have a resolution higher than that of the absolute angular signal, as is the case with Embodiment 1.

The foregoing angle detector according to Embodiment 2 is provided with the configuration according to (1) and further includes a configuration according to (5) below.
(5) The angle calculation unit is provided with an initial angle setting unit that sets one angle out of M angles, obtained by dividing the electric-angle range of the one electric-angle rotation into M sections, to an initial angle, when detecting a first or an Nth signal of the N-step relative angular signal.

This configuration makes it possible to set an appropriate electric angular signal even when a manufacturing error exists.

Embodiment 3

Figure 11:
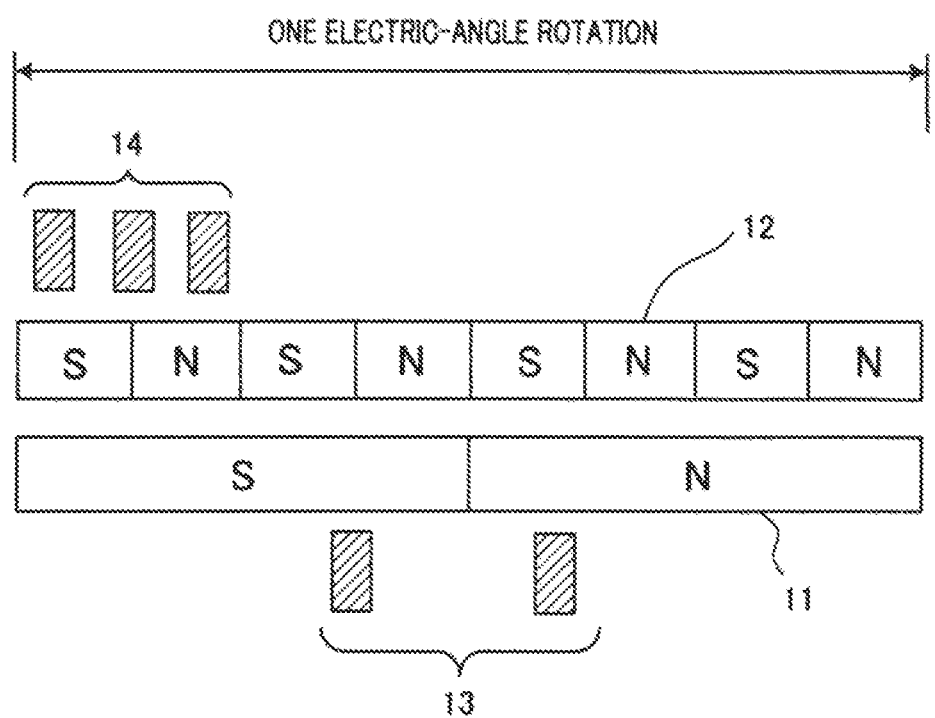
FIG. 11 is a schematic diagram representing Hall signals, extracted during one electric-angle rotation and expressed on respective straight lines, in an angle detector according to Embodiment 3.

Next, an angle detector according to Embodiment 3 will be explained. Embodiment 3 of the present disclosure differs from foregoing Embodiment 1 in the number of Hall devices in the first Hall device group, the number of Hall devices in the second Hall device group, and the number of pole-pairs in the second track; however, the other configurations thereof are the same as those of Embodiment 1. FIG. 11 is a schematic diagram representing Hall signals, extracted during one electric-angle rotation and expressed on respective straight lines, in the angle detector according to Embodiment 3.

As illustrated in FIG. 11, in Embodiment 3, the number m of Hall devices in the first Hall device group 13 is 2, and the number n of Hall devices in the second Hall device group 14 is 3. As is the case with Embodiment 1, the first track 11 has 5 pole-pairs per mechanical-angle rotation, i.e., P=5, and 1 pole-pair per electric-angle rotation. The second track 12 has 20 pole-pairs per mechanical-angle rotation, i.e., Q=20, and 4 pole-pairs per electric-angle rotation. In this configuration, M=2 m=4; "4 pole-pairs per electric-angle rotation" is equal to M. In addition, N=2n=6.

Based on the absolute angular signal from the first detection unit 15 and the relative angular signal from the second detection unit 16, the angle calculation unit 17 divides one electric-angle rotation into [M×N] sections and calculates an [M×N]-step electric angular signal. Because an M-step signal and an N-step signal are combined, an [M×N]-step signal can be outputted. Because M is 4 and N is 6, M×N=24. Because one electric-angle rotation, i.e., 360° is divided into 24 sections, the angle calculation unit 17 outputs a 15°-resolution stepped electric angular signal.

In this situation, with regard to the number Q of pole-pairs in the second track 12, the relationship [Q=2×m×P=M×P] is established. In Embodiment 3, Q is 4P. When this relationship is established, an [M×N]-step electric angular signal can be outputted by combining an M-step signal and an N-step signal. Thus, an electric angular signal having a high resolution of [360/(M×N)]° can be obtained as soon as angle detection has been started.

The foregoing angle detector according to Embodiment 3 is provided with the configuration according to (1) and further includes a configuration according to (6) below.
(6) The first Hall device group has two Hall devices; the second Hall device group has three Hall devices; the number Q of pole-pairs in the second track is 4P.

In the angle detector including the foregoing configuration, an electric angular signal having a high resolution of [360/(M×N)]° can be obtained as soon as angle detection has been started.

Embodiment 4

Figure 12:
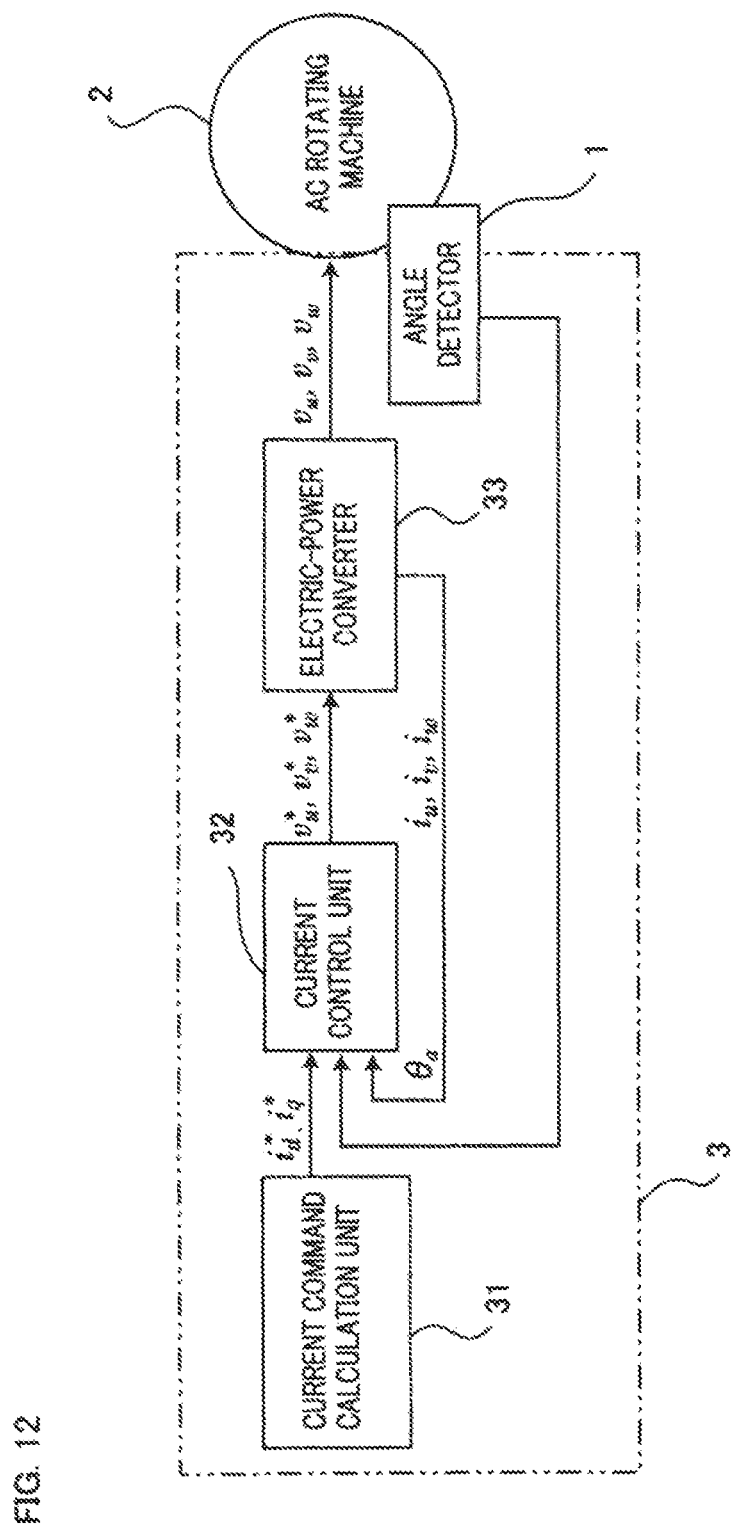
FIG. 12 is a configuration diagram representing an AC-rotating-machine controller according to Embodiment 4.

Next, an angle detector according to Embodiment 4 will be explained. FIG. 12 is a configuration diagram representing an AC-rotating-machine controller according to Embodiment 4. FIG. 12 also represents an AC rotating machine 2, which is the control subject of an AC-rotating-machine controller 300. The AC-rotating-machine controller 300 according to Embodiment 4 is provided with the foregoing angle detector 1 according to Embodiment 1. The angle detector 1 measures the electric angle θ of the AC rotating machine 2 so as to obtain the electric angular signal θh, corrects the electric angular signal θh, and then outputs correction angle θa.

As the AC rotating machine 2 having three-phase windings, a publicly known motor, for example, a surface-permanent-magnet (SPM) synchronous motor, an interior-permanent-magnet (IPM) synchronous motor, or the like my be utilized. The AC rotating machine 2 has a set of three-phase windings (unillustrated) including a U-phase winding, a V-phase winding, and a W-phase winding. In addition, the AC rotating machine 2 has a rotor (unillustrated) configured in such a way that a permanent magnet or a magnetic-field winding generates magnetic flux.

Embodiment 4 will be explained with an exemplary case where the AC rotating machine 2 is an AC rotating machine having a set of three-phase windings; however, Embodiment 4 can be applied also to an AC rotating machine having two sets of three-phase windings or multi-phase windings of four or more phases.

In FIG. 12, an electric-power converter 33 applies conventional modulation processing to after-mentioned three-phase voltage commands vu*, vv*, and vw* so as to apply respective AC voltages to the U-phase winding, the V-phase winding, and the W-phase winding. The method of the conventional modulation processing to be performed by the electric-power converter 33 is, for example, a PWM (Pulse Width Modulation) method, a PAM (Pulse Amplitude Modulation) method, or the like.

A current detector (unillustrated) is mounted in the electric-power converter 33 and detects a current Iu in the U-phase winding, a current Iv in the V-phase winding, and a current Iw in the W-phase winding. Here, Iu, Iv, and Iw will collectively be referred to as a three-phase winding current. The current detector is configured by use of a conventional current detector such as a shunt resistor, a Hall device, or the like. In addition, there has been described that the three-phase winding currents Iu, Iv, and Iw are detection values obtained from the current detector; however, values estimated according to respective voltage equations may be utilized, without utilizing any current detector.

A current command calculation unit 31 calculates current commands, which are respective target values of currents to be applied to the three-phase windings. As the current commands, a d-axis current command id* and a q-axis current command iq* on dq axes, which are rotational-coordinate axes.

Figure 13:
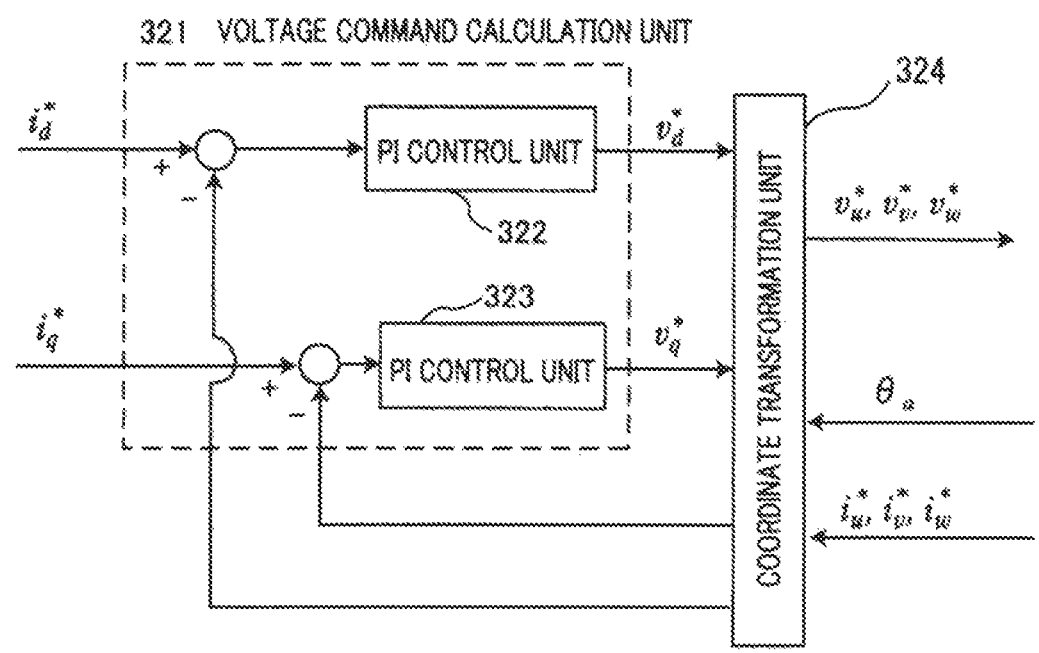
FIG. 13 is a block diagram representing the configuration of a current control unit in the AC-rotating-machine controller according to Embodiment 4.

A current control unit 32 is configured in such a manner as represented in FIG. 13. That is to say, FIG. 13 is a block diagram representing the configuration of the current control unit in the AC-rotating-machine controller according to Embodiment 4. As represented in FIG. 13, the current control unit 32 is provided with a coordinate transformation unit 324 and a voltage command calculation unit 321. Based on the correction angle θa, the coordinate transformation unit 324 applies coordinate transformation to a d-axis voltage command vd* and a q-axis voltage command vq* so as to create the U-phase voltage command vu*, the V-phase voltage command vv*, and the W-phase voltage command vw*. Moreover, based on the correction angle θa, the coordinate transformation unit 324 applies coordinate transformation to a U-phase detection current iu, a V-phase detection current iv, and W-phase detection current iw so as to create a d-axis detection current id and a q-axis detection current iq.

The voltage command calculation unit 321 calculates the d-axis voltage command vd* and the q-axis voltage command vq* for controlling the output voltage of the electric-power converter in such a way that the difference between the current command and the detection current becomes small. The calculation method for each of the d-axis voltage command vd* and the q-axis voltage command vq* is not limited, in particular; a conventional calculation method for the voltage command may be utilized. For example, as a feedback controller for the difference between the d-axis current command id* and the d-axis detection current id, a PI controller 322, which is a proportional integral controller, is configured, and the d-axis voltage command vd* is calculated. Similarly, as a feedback controller for the difference between the q-axis current command iq* and the q-axis detection current iq, a PI controller 323, which is a proportional integral controller, is configured, and the q-axis voltage command vq* is calculated.

The foregoing AC-rotating-machine controller according to Embodiment 4 is provided with a configuration described in (7).

(7) An AC-rotating-machine controller having the angle detector according to any one of foregoing (1) through (6) and controlling an AC rotating machine, based on the correction angle.

In this configuration, provision of the foregoing angle detector makes it possible to detect an angle with a high resolution; because current control is performed by use of the angle, it is made possible to smoothly rotate an AC rotating machine.

Embodiment 5

Figure 14:
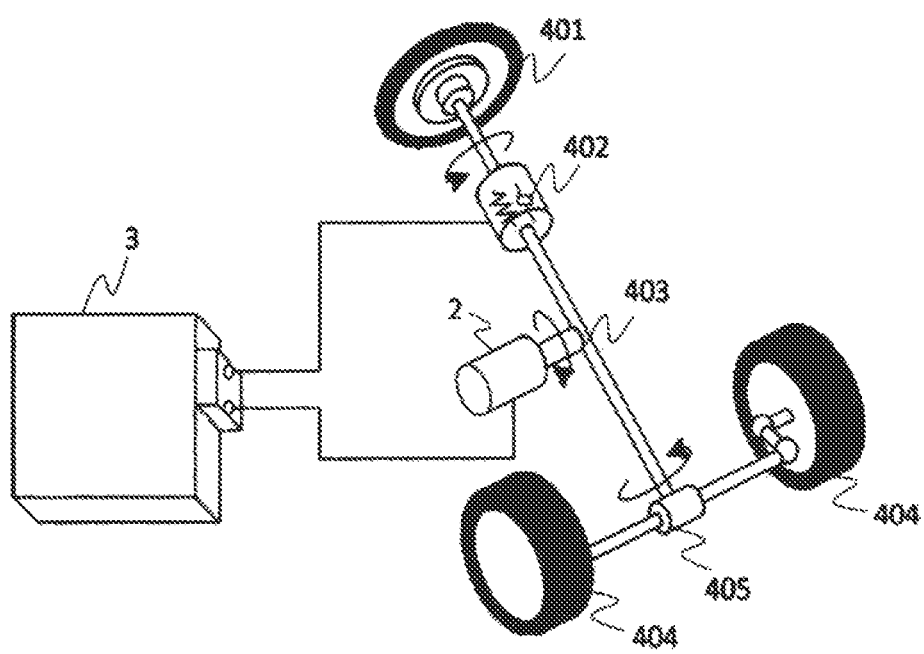
FIG. 14 is a configuration diagram illustrating an electric power steering apparatus according to Embodiment 5.

Next, an electric power steering apparatus according to Embodiment 5 will be explained. Embodiment 5 relates to an electric power steering apparatus provided with the AC-rotating-machine controller according to foregoing Embodiment 4. FIG. 14 is a configuration diagram illustrating an electric power steering apparatus according to Embodiment 5.

In FIG. 14, the electric power steering apparatus is provided with a steering wheel 401, a steering shaft 403, a rack-and-pinion gear 405, vehicle wheels 404, the AC rotating machine 2 that assists steering by a driver, a control apparatus 300 that controls the AC rotating machine 2, and a torque sensor 402 that detects steering torque caused by the driver.

Steering torque exerted on a steering wheel 401 by an unillustrated driver is transferred to a rack-and-pinion gear 405, through the intermediary of a torsion bar provided in the torque sensor 402 and the steering shaft 403, and then is further transferred from the rack-and-pinion gear to the rack, so that the vehicle wheels 404 are turned. The AC rotating machine 2 is driven by the AC-rotating-machine controller 300 and outputs assist force, as the output thereof. The assist force is transferred to the steering shaft 403 so as to reduce steering torque to be exerted by the driver performing steering.

The current command for driving the AC rotating machine 2, to be calculated by the AC-rotating-machine controller 300, is calculated based on the steering torque that is caused by the driver and is detected by the torque sensor 402. For example, the current command is calculated, as a value proportional to the steering torque caused by the driver. As a result, it is made possible that assist torque for reducing steering torque to be caused by the driver is obtained from the AC rotating machine 2.

The foregoing electric power steering apparatus according to Embodiment 5 is provided with a configuration described in (8).

(8) An electric power steering apparatus including the AC-rotating-machine controller according to foregoing (7), wherein the AC rotating machine generates assist torque, based on steering torque caused by a driver.

This configuration makes it possible that an angle is detected with a high resolution so that an AC rotating machine is smoothly rotated; thus, a driver can smoothly perform steering.

Although the present disclosure is described above in terms of various exemplary embodiments, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present application. For example, there are included the case where at least one constituent element is modified, added, or omitted and the case where at least one constituent element is extracted and then combined with constituent elements of other embodiments.

Figure 15:
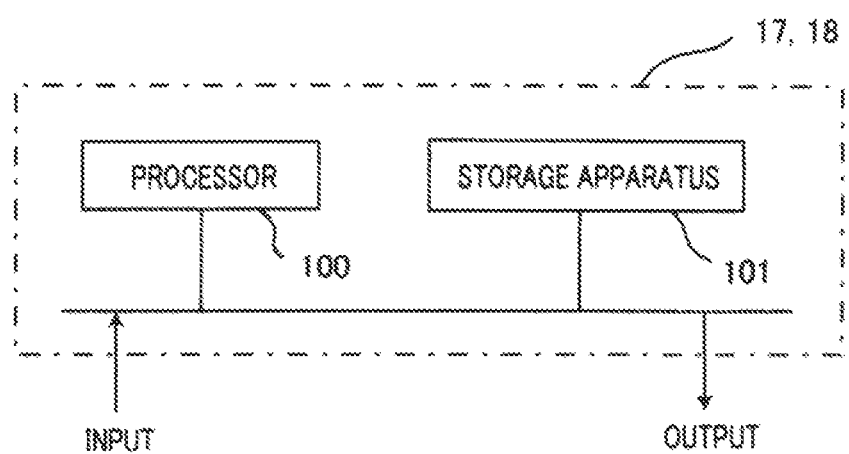
FIG. 15 is a configuration diagram representing the hardware of each of the angle calculation unit and the angle correction unit in FIG. 4, the initial angle setting unit in FIG. 9, and the initial angle setting unit in FIG. 10.

The hardware of each of the angle calculation unit 17 and the angle correction unit 18 in FIG. 4, the initial angle setting unit in FIG. 9, and the initial angle setting unit in FIG. 10 includes the processor 100 and the storage apparatus 101, as is represented in FIG. 15. In other words, although not illustrated, the storage apparatus has a volatile storage device such as a random access memory and a nonvolatile auxiliary storage device such as a flash memory. Additionally, instead of the flash memory, a hard disk may be included as the auxiliary storage device. The processor 100 implements a program inputted from the storage device 101. In this case, the program is inputted from the auxiliary storage device to the processor 100 by way of the volatile storage device. Moreover, the processor 100 may output data such as a calculation result either to the volatile storage device of the storage device 101 or to the auxiliary storage device by way of the volatile storage device.

DESCRIPTION OF REFERENCE NUMERALS

1: angle detector
11: first track
12: second track
13: first Hall device group
14: second Hall device group
15: first detection unit
16: second detection unit
17: angle calculation unit
18: angle correction unit
181: speed calculation unit
182, 322, 323: PI controller
183: integrator
2: AC rotating machine
300: AC-rotating-machine controller
31: current command calculation unit
32: current control unit
33: electric-power converter
321: voltage command calculation unit
324: coordinate transformation unit
401: steering wheel
402: torque sensor
403: steering shaft
404: vehicle wheel
405: rack-and-pinion gear

The invention claimed is:

1. An angle detector that can detect, as one electric-angle rotation corresponding to a one-period electric angle, a mechanical-angle range of one section out of sections obtained by dividing one mechanical-angle rotation corresponding to one rotation of a rotation axle into P sections (P is a natural number), the angle detector comprising:
a magnet that is fixed on the rotation axle and has a first track including magnets magnetized in P pole-pairs and a second track including magnets magnetized in Q pole-pairs (Q is a positive even number the same as or larger than 2P);
a first Hall device group that is disposed facing the magnet and that senses magnetic flux from the first track and then outputs a first Hall signal;
a second Hall device group that is disposed facing the magnet and that senses magnetic flux from the second track and then outputs a second Hall signal;
a first detector that outputs an M-step absolute angular signal corresponding to M angle sections obtained by dividing the one electric-angle rotation into M sections, based on the first Hall signal from the first Hall device group (M is a positive even number);
a second detector that outputs an N-step relative angular signal that divides each of the M angle sections, obtained by dividing an electric-angle range of the one electric-angle rotation into M sections, into N sections, based on the second Hall signal from the second Hall device group (N is a positive even number);
an angle calculator that divides the electric-angle range of the one electric-angle rotation into [M×N] sections and that calculates and outputs an [M×N]-step electric angular signal, based on the absolute angular signal and the relative angular signal; and
an angle corrector that outputs a correction angle supplemented to smooth the [M×N]-step electric angular signal,
wherein the angle corrector is configured to calculate a first speed from a time during which the relative angular signal changes, calculate a second speed based on a difference between the correction angle and the electric angular signal, and then integrate a sum of the first speed and the second speed to calculate the correction angle.

2. The angle detector according to claim 1, wherein the angle calculator is provided with an initial angle setting unit that sets one angle out of M angles, obtained by dividing the electric-angle range of the one electric-angle rotation into M sections, to an initial angle, when detecting a first or an Nth signal of the N-step relative angular signal.

3. The angle detector according to claim 2,
wherein the first Hall device group has m Hall devices (m is a natural number), and
wherein the number Q of pole-pairs in the second track is 2 mP.

4. The angle detector according to claim 2, wherein the first Hall device group has three Hall devices,
wherein the second Hall device group has two Hall devices, and
wherein the number Q of pole-pairs in the second track is 6P.

5. The angle detector according to claim 2,
wherein the first Hall device group has two Hall devices,
wherein the second Hall device group has three Hall devices, and
wherein the number Q of pole-pairs in the second track is 4P.

6. An AC-rotating-machine controller comprising the angle detector according to claim 2 and controlling an AC rotating machine, based on the correction angle.

7. An electric power steering apparatus comprising the AC-rotating-machine controller according to claim 6, wherein the AC rotating machine generates assist torque, based on steering torque caused by a driver.

8. The angle detector according to claim 1,
wherein the first Hall device group has m Hall devices (m is a natural number), and
wherein the number Q of pole-pairs in the second track is 2 mP.

9. An AC-rotating-machine controller comprising the angle detector according to claim 8 and controlling an AC rotating machine, based on the correction angle.

10. An electric power steering apparatus comprising the AC-rotating-machine controller according to claim 9, wherein the AC rotating machine generates assist torque, based on steering torque caused by a driver.

11. The angle detector according to claim 1,
wherein the first Hall device group has three Hall devices,
wherein the second Hall device group has two Hall devices, and
wherein the number Q of pole-pairs in the second track is 6P.

12. An AC-rotating-machine controller comprising the angle detector according to claim 11 and controlling an AC rotating machine, based on the correction angle.

13. The angle detector according to claim 1,
wherein the first Hall device group has two Hall devices,
wherein the second Hall device group has three Hall devices, and wherein the number Q of pole-pairs in the second track is 4P.

14. An AC-rotating-machine controller comprising the angle detector according to claim 1 and controlling an AC rotating machine, based on the correction angle.

15. An electric power steering apparatus comprising the AC-rotating-machine controller according to claim 14, wherein the AC rotating machine generates assist torque, based on steering torque caused by a driver.

* * * * *